Feb. 10, 1970     D. W. JOHNSON ET AL     3,494,092
INTEGRATED FOLDING SLAB CONSTRUCTION
Filed July 5, 1967     5 Sheets-Sheet 1
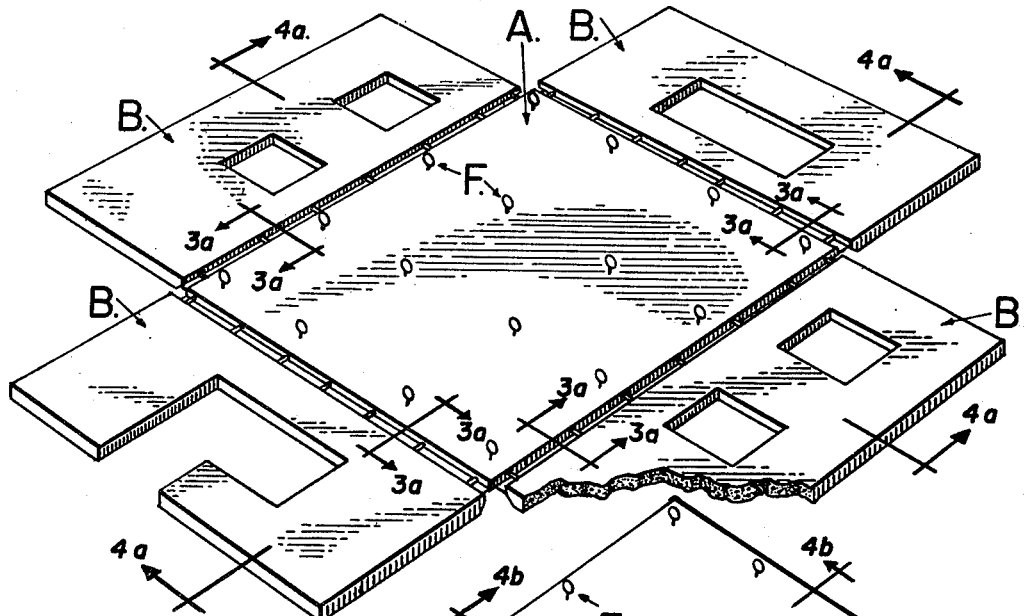
Fig. 1.
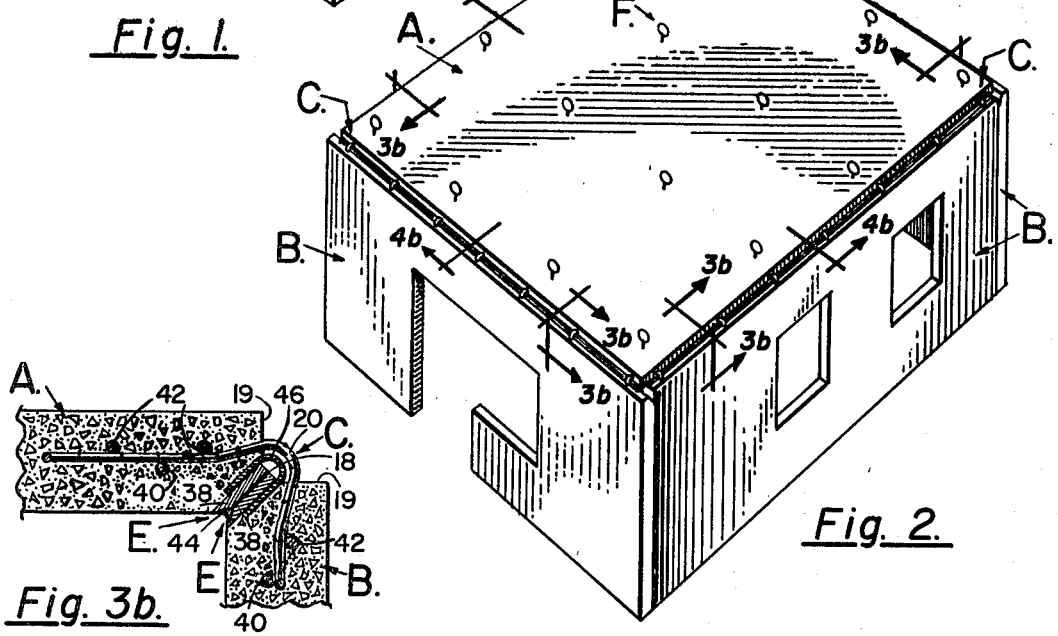
Fig. 2.
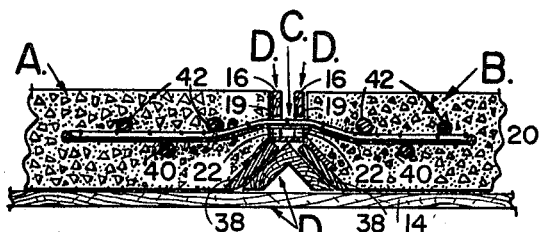
Fig. 3b.
Fig. 3a.
INVENTORS
DELP W. JOHNSON
RICHARD E. BOTTJER
BY
Townsend and Townsend

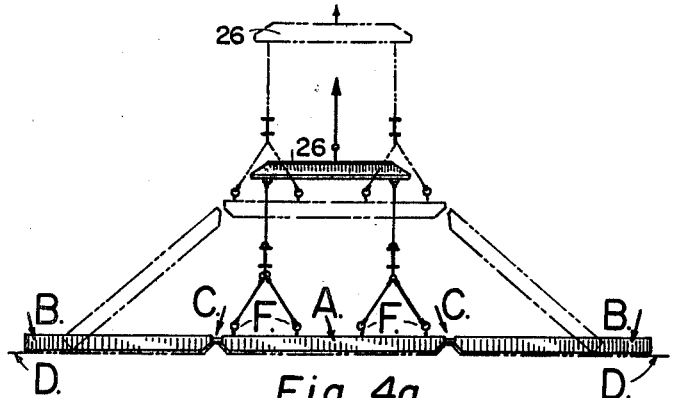
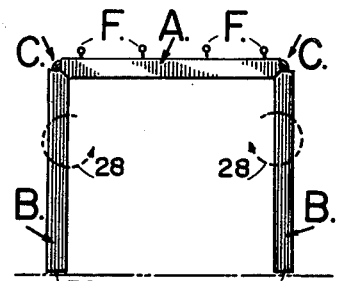
Fig. 4a. Fig. 4b.
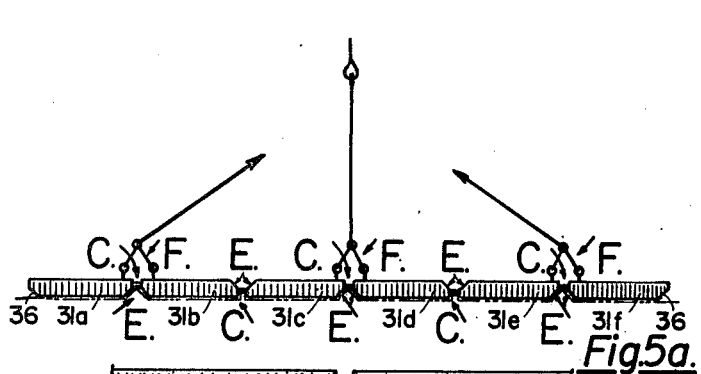
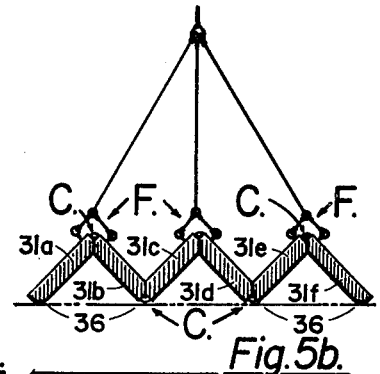
Fig. 5a. Fig. 5b.
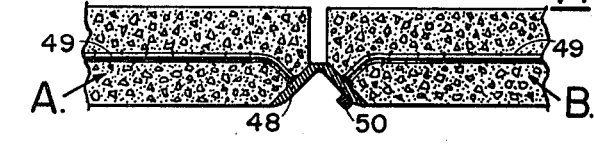
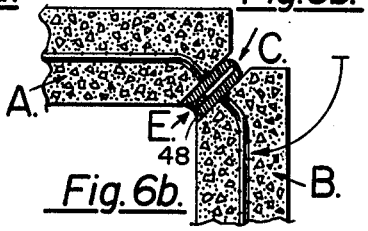
Fig. 6a. Fig. 6b.
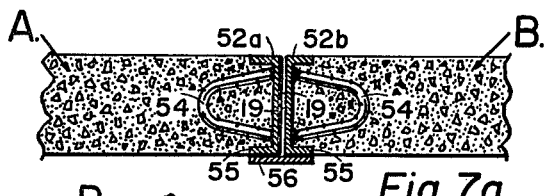
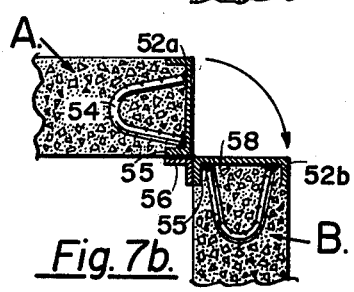
Fig. 7a. Fig. 7b.
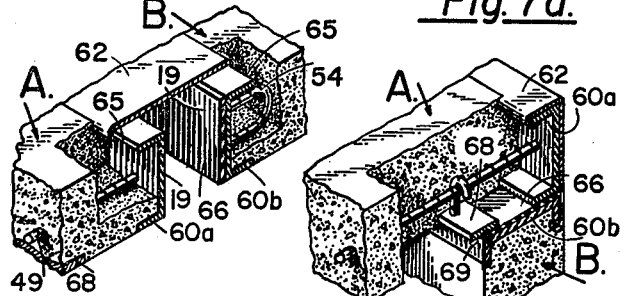
Fig. 8a. Fig. 8b.
INVENTORS
DELP W. JOHNSON
RICHARD E. BOTTJER
BY Townsend and Townsend

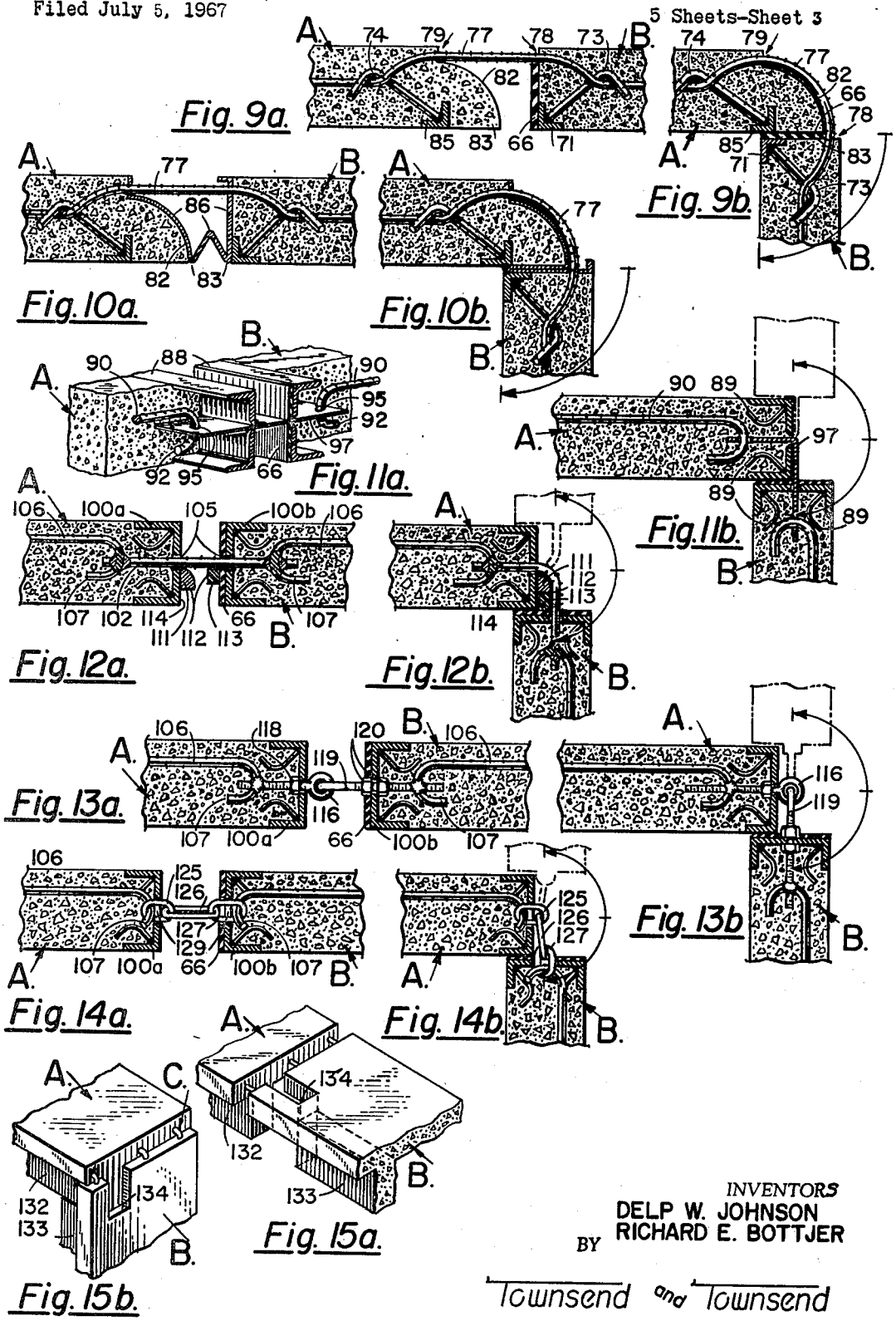

Feb. 10, 1970   D. W. JOHNSON ET AL   3,494,092
INTEGRATED FOLDING SLAB CONSTRUCTION
Filed July 5, 1967   5 Sheets-Sheet 4

INVENTORS
DELP W. JOHNSON
RICHARD E. BOTTJER
BY
Townsend and Townsend

INVENTORS
DELP W. JOHNSON
RICHARD E. BOTTJER
BY
Townsend and Townsend

United States Patent Office 3,494,092
Patented Feb. 10, 1970

3,494,092
INTEGRATED FOLDING SLAB CONSTRUCTION
Delp W. Johnson, San Carlos, and Richard E. Bottjer, Orinda, Calif., assignors to Delp W. Johnson, San Carlos, Calif.
Filed July 5, 1967, Ser. No. 651,166
Int. Cl. E04b 1/343, 1/348; E04g 21/14
U.S. Cl. 52—745                          2 Claims

ABSTRACT OF THE DISCLOSURE

A building construction technique whereby panels are permanently joined by bendable members while being disposed in a substantially parallel planar relationship and thereafter the panels are erected in relative angular relationship to form the erected building structure in such a manner as to allow the bendable members to be maintained in an integral structural binder between the panels.

---

This invention relates to a method of and apparatus for forming permanent building structures in which slab members are prefabricated, joined and erected into a building structure by bending or swinging integrally formed connecting members during the erecting procedure.

In the art of building permanent structures, various techniques have been employed to utilize the advantages of prefabrication of ceiling, floor and wall panels prior to their being erected into the finished building structure. Commonly, such panels are prefabricated on the situs or elsewhere and then individually erected to form the finished and completed structure. Conventional hinged mechanisms have been employed for hingeably joining the building panels to facilitate their erection. Such hinge panel structures usually require the individual hinge members to be positioned on each panel and thereafter the panel moved in relation to one another so as to register and align the independently fastened hinge members. After such registry and alignment, a pin is normally inserted which completes the hinge joint and then the panel is rotated to the erected position, and in such a position, again aligned and pinned with other hinge members so as to complete the structural integrity of the hingeably connected building.

Such construction has the disadvantage of requiring precise placement of each hinge member on each panel as independently fabricated. Furthermore, the panels must then subsequently be positioned relative to one another, first to complete the desired hinge and secondly rotatably moved with respect to one another so as to complete the desired structure. These techniques, while satisfactory for light, temporary structures wherein relatively small and lightweight panels can be manipulated with respect to one another, are wholly unsatisfactory for permanent and weighty buildings made of reinforced concrete and the like. Precise hinge member placement on each concrete slab as formed is not often possible and individual manipulation of heavy and bulky concrete panels with respect to one another is impracticable.

The present method and apparatus sets forth a system of forming concrete panel buildings by placing interior of juxtaposed and parallel molds integrally formed hinged structures which interconnect the subsequently poured and cured concrete panels. Thereafter, the connected panels are elevated and rotated along the hinged structure so as to form the completed concrete building without the expensive and time consuming process of independently positioning each hinge member on each panel and then individually moving the bulky concrete panels with respect to one another so as to align or register the hinge members.

An advantage of this invention is that a reinforced concrete structure may be formed and erected without the supplementary process of erecting molds or field bracing conforming to the finished dimensions of the concrete building. Conventional concrete construction techniques usually require fabrication and erection of complex molds and forms conforming to the finished dimension of the completed structure. Reinforcing rod is then inserted interior of such molds after being bent and conformed to the mold dimensions. The concrete is then laboriously transported interior of the mold structure and poured immediately overlying the molds. Thereafter, the molds are stripped leaving the finished and cured concrete building.

In the present invention, all panels of the completed concrete structure are formed, preferably in horizontal, parallel and adjoining molds, eliminating the requirement of relatively expensive transport of the concrete interior of an erected mold structure. Furthermore, the concrete reinforcing steel or tie rods are utilized as connecting structure between panels and bend similar to a hinge. When the panels are erected, the tie rods are structurally integral with both adjoining slabs or panels and make a unitary structure forming a completed concrete building without molds or field bracing.

In an important aspect of the invention, a roof assembly or panel is formed in a horizontal plane or mold and wall panels are arranged in juxtaposition and separate from the edges of the ceiling panel. Dutile structural members embedded in both the ceiling and the wall panels interconnect these panels. Thereafter the ceiling panel, while maintaining its horizontal aspect, is moved in elevation to allow the wall panels to depend into their normal vertical position. The interlocking edges of the ceiling and wall panels are arranged to allow the upper edges of the wall panels to underlie in supporting relationship the bottom edges of the ceiling panel, thus allowing a bearing support for the ceiling panel. In this structure, the ductile structural supports embedded and connected with both panels form an interlock which positively prevents lateral and transverse movement of the wall panels relative to the ceiling thus creating a bonded integral composite completed structure.

Another feature of this invention lies in the provision of bonding plates mounted on the abutting edges of adjacent panels which form structural integrity for the edges and which may later be bonded in structural unity such as by welding when formed of metal to maintain the completed structure in a completely integral structural relationship A feature of the invention is in the provision of bendable moisture sealing flanges which are formed integrally with both of the panels while in their initial co-planar relationship to provide positive moisture sealing after the panels have been moved to their relative angular relationship in their completed structure.

A further feature and advantage of this invention lies in the fact that the panels may be erected at various angular relationships extending from normal to virtually any acute or obtuse angle whereby variations in architectural freedom can be readily employed with the method and apparatus of the present invention.

Another object of this invention is to provide a plurality of novel interlocking edges adapted for various architectural configurations which operate in conjunction with the ductile or hinged joint, thereby allowing still further architectural freedom of building design.

Another object of this invention is to provide a building structure which can be formed on the situs in substantially co-planar, horizontal molds and which thereafter can be erected to form a ceiling and walled structure simply by elevating the ceiling to an appropriate height whereby gravitation assists in the angling of the wall portion of the structure to bring about the substantially vertical positioning thereof.

Another feature and advantage of this invention lies in the fact that common panel construction techniques can be integrated with the preformed interlocking structure of this invention including such techniques as prestressing and poststressing of concrete and similar materials.

A still further object of this invention is to provide universal application of the system to structural panels other than concrete, such as metal, sandwich, wood, plastic and other panel configurations, the intent of the invention being the interlocking structural embedding within the panel structure itself of the hinge members whereby the hinge member forms the structural interlock of the erected structure.

Another object of this invention is to provide a building structure in which juxtaposed panels are tied by tie rods integrally mated with each of said panels and which are under tension in the building structure to assist in maintaining the panels in structural integrity.

An advantage of this invention is that the reinforcing rod of each slab may be extended between parallel and adjoining slabs so as to form a unitary joint in the completed structure when the slabs are rotated and erected.

Other objects, features and advantages of the present invention will be more apparent after referring to the following specification and attached drawings in which:

FIG. 1 is a perspective view of adjoined slabs for forming a unitary building structure showing their relative disposition immediately prior to erection;

FIG. 2 is a perspective view of the slabs in FIG. 1 as erected;

FIG. 3a is a side elevation section of hingedly joined slab members in the unerected disposition illustrating the placement of form members used in fabrication of the slabs;

FIG. 3b is a side elevation section of the integral hinge between the slabs of FIG. 3a as erected;

FIG. 4a is a side elevation view of integrally joined slabs or panels being erected by a lift apparatus elevating one panel and allowing the adjoined panels to depend gravitationally to erected positions;

FIG. 4b is a side elevation view of the panels of FIG. 4a as erected specifically illustrating the use of the integrally joined slabs to form a unitary building structure;

FIG. 5a is a side elevation view of a plurality of panels having integral hinged members therebetween;

FIG. 5b is a side elevation view of the panels of FIG. 5a as erected forming an accordion-like integrally supported roof structure;

FIG. 6a is a side elevation section showing adjoined slabs with their integral hinge made from a single edge plate extending along both panel edges;

FIG. 6b is a side elevation section of the slabs of FIG. 6a as erected with a weld fastening the common edge plate;

FIG. 7a is a side elevation section of two slabs having abutting reinforced channel ends and an integral and bendable plate affixed to and adjoining each adjacent channel end at one side portion thereof;

FIG. 7b is a side elevation section of the slabs of FIG. 7a as erected showing the use of the plate as bent to form the sole support between the adjoining slabs;

FIG. 8a is a perspective section of adjoined slabs having channel ends, which ends are separated and joined by an integral sheet hinge extending between each channel end at one side portion thereof;

FIG. 8b is a perspective section of the slabs or panels of FIG. 8a as erected showing one adjoined panel underlying the adjacent and adjoined panels in a supporting relationship;

FIG. 9a is a side elevation section of adjoining slabs, one of the slabs having an arcuate or curved surface at the end thereof;

FIG. 9b is a side elevation section of the slabs of FIG. 9a as erected with the reinforcing bar extending between the slabs shown disposed over the arcuate or curved surface;

FIG. 10a is a side elevation section of slabs similar to those in FIG. 9 and specifically illustrating the use of a sheet member along the ends of both slabs to reinforce the integral hinge and act as integral weather seal;

FIG. 10b is a side elevation section of the slabs or panels of FIG. 10a as erected specifically illustrating the disposition of the sheet member for forming a part of the integral hinge between the adjoined slabs;

FIG. 11a is a perspective section of two adjoining slabs or panels having a common sheet member medially disposed in each slab interconnecting the adjoined slabs;

FIG. 11b is a side elevation view of the slabs of FIG. 11a as erected illustrating in dotted lines the alternate erected angular disposition of the adjoined slabs;

FIG. 12a is a side elevation section of adjoining slabs, the slabs being interconnected by a bar hooked and welded to both reinforcing members interior of each slab and the channel forming the slab end;

FIG. 12b is a side elevation section of the slabs of FIG. 12a as erected illustrating the cooperation of lugs attached to each channel member for placing the slabs in precise angular disposition with respect to one another;

FIG. 13a is a side elevation section of adjoined slabs interconnected by eye bolts, each bolt being integrally connected to reinforcing bar interior of the slab;

FIG. 13b is a side elevation view of the slabs in FIG. 13a as erected;

FIG. 14a is a side elevation section of slabs hingedly joined by means of chain links;

FIG. 14b is a side elevation section of the slabs of FIG. 14a as erected;

FIG. 15a is a perspective view of integrally adjoined slabs, each slab having a beam formed therein;

FIG. 15b is a perspective view of the slabs of FIG. 15a as erected with the integral beams underlying one another in a supporting relationship;

FIG. 20 is a partial side elevation view of panels joined at obtuse angles for forming an arch;

FIG. 20b is a detail of FIG. 20a illustrating the specific joint interconnecting the panels in FIG. 20a;

Figures 21, 22, 23A, 23B:
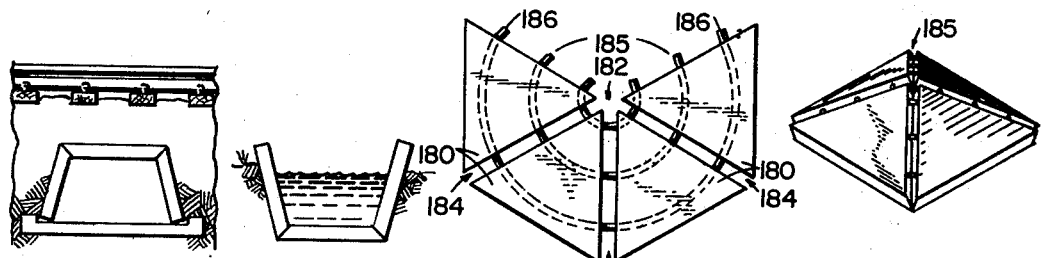
Figure 24A:
Figure 24B:
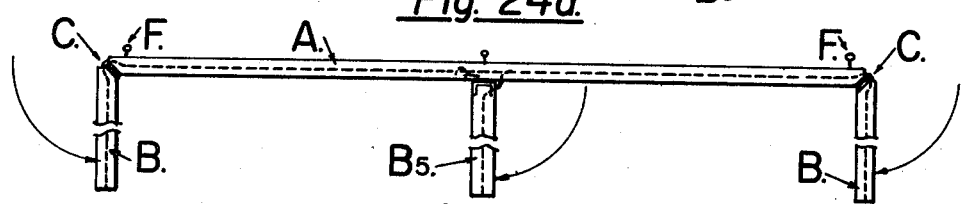
Figures 24C, 24D:
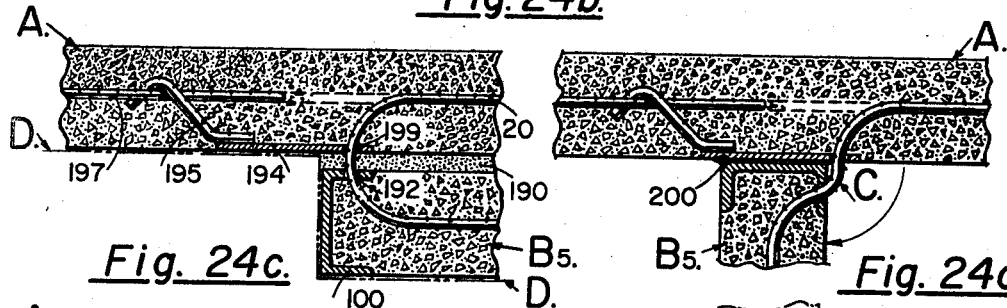
Figures 24E, 24F:
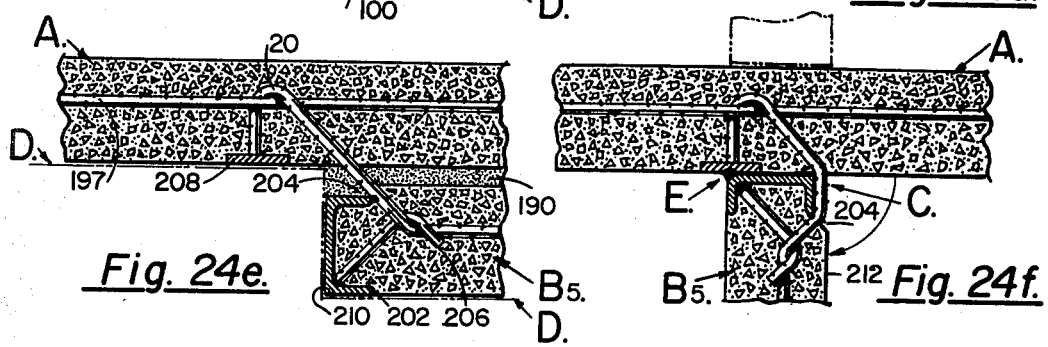

FIG. 21 illustrating a culvert constructed from panels adjoined and erected according to the present invention;

FIG. 22 illustrates a canal constructed according to the present invention;

FIG. 23a shows four isosceles triangular slabs or panels integrally attached along three adjoining sides for forming a pyramid type structure having a square base;

FIG. 23b illustrates the erected disposition of the adjoined slabs into a pyramid;

FIG. 24a is a side elevation view illustrating an embodiment of the integrally formed hinge wherein the adjoined panels are formed in overlying and parallel panels with one panel medially hinged to an adjacent panel;

FIG. 24b is a side elevation section of the panels of FIG. 24a as erected specifically illustrating the medial depending erection of a wall slab with respect to a ceiling slab;

FIG. 24c is a side elevation section in detail of the hinge adjoining the wall and ceiling slab of FIG. 24a;

FIG. 24d is a side elevation section in detail of the hinge of FIG. 24a as erected;

FIG. 24e is a side elevation section illustrating an alternate embodiment of the integral hinge structure as adapted to a slab medially hinged with respect to an adjoining slab; and, FIG. 24f is a side elevation section of the slab of FIG. 24e as erected.

With specific reference to FIGS. 1, 2, 3a and 3b, ceiling panel or slab A is shown joined to side wall panels or slabs B by means of integrally attached hinge member C. Panels A and B are commonly fabricated by placing forms D (shown in FIG. 3a) in a juxtaposed and parallel relationship and inserting a plurality of integral hinge members C therebetween. The panels are then poured and cured or otherwise fabricated so as to attach integrally to each panel, hinge member C. Thereafter, ceiling panel or slab A is elevated, typically by hoist apparatus attaching to lifting rings F embedded in ceiling panel A. Side wall panels or slabs B gravitationally rotate with respect to the elevated panel A so as to bend or swing integral hinge member C. As shown in FIG. 3b, the slabs or panels as elevated contact one another along panel edges E while at the same time placing the integral hinged members C under tension forming an integral building joint along panel or slab junctures resulting in the completed building structure as illustrated in FIG. 2.

Slabs or panels A and B are typically made of concrete. This concrete upon being poured and cured interior of molds D surrounds hinged members C, integrally joining them into the panel structure. Panels or slabs A and B, however, may alternately be formed of materials other than concrete, such as metal, wood, plastic or sandwich and layered construction, the only requirement being that the joined hinge members be integrally fastened to each panel.

With reference to FIG. 3a, a method of fabricating two panel slabs is shown utilizing juxtaposed forms D. Forms D comprise bottom form 14, edge form 15 and end form 16, the form members having dimensions coextensive with the desired dimensions of the finished panels. Forms D have edge forms 15 juxtaposed with respect to one another in a spatial relation which anticipates the erected position of slabs A and B. Commonly these forms contain poured concrete and have an inside dimension conforming to the desired outside dimension of each slab as cured.

It will be noted that edge form member 15 is inclined at an angle approximately 45° with respect to bottom and end form members 14 and 16. This inclination enables the panels as erected to join one another along common interface 18 co-extensive with each panel edge E as illustrated in FIG. 3b.

Extending between adjoined forms E is common reinforcing rod or re-bar 20. Re-bar 20 is typically made of mild structural steel which is ductile to allow bending while maintaining substantially all its tensile strength. Re-bar 20 is shown in FIG. 3a extending between adjoined forms D through form aperture 22 in end forms 16. This extension allows re-bar 20 to form a reinforcing member in each slab while at the same time forming integral hinge member C therebetween.

When molds or forms D are placed with re-bar 20 extending therebetween, concrete is poured and cured interior of each mold. Upon curing, re-bar 20 as extending between adjoining slabs A and B integrally attaches to the cured concrete forming hinge member C.

Erection of the adjoined slabs is specifically illustrated in FIGS. 4 and 5. With specific reference to FIG. 4a, a ceiling panel or slab A is shown having side wall panels or slabs B attached by integral hinge member C at either side of the ceiling panel. Ceiling panel A is shown having four integrally attached lifting lugs F connected to spreaders 26 and thence to a lifting apparatus (not illustrated).

As shown in the imaginary view (illustrated in dotted lines in FIG. 4a) fabrication of the adjoined slabs is achieved by elevating slab A with respect to slabs B on either side thereof. Upon such elevation, slabs B will gravitationally depend relative to slab A, bending hinge members C as they rotate through an arc of approximately 90°. The edges of the wall panels B will finally abut edges E of slab A at each side arresting the gravitational rotation.

Integral hinge member C as extending between adjoined slab ends 19 was given a length allowing the intended hinge movement between slabs or panels A and B. This length was, at the same time, restricted so that when the slabs reached their erected angular position relative to one another, a tensiled force through the integral hinge member C would arrest the rotation. This tensile force is opposed by a compressive force between adjoined panel edges E along interface 18 at the inside of the panel juncture. This interaction of the tensile forces in integral hinge member C opposing the compressive forces at adjoined edges E may be utilized to form an integral self-sustaining structure with the disclosed joints.

With reference to FIGS. 3b and 4b, the formation of ceiling panel A and side panels B into an integral self-sustaining structure may be specifically illustrated. Re-bar 20 upon forming integral hinge member C between rotated slabs A and B comes under tension as the slabs reach their intended erected angular dispositions, which tension is opposed by compression occurring at panel edges E adjusting one another along common interface 18. If a moment is applied to either erected panel B in the direction of panel movement or rotation during erection (as represented by arrows 28), the tension in re-bar 20 will oppose further rotation of each panel B with respect to central or ceiling panel A.

If panels B are maintained at panel bottoms 30 in a spatial relationship supporting ceiling panel A as illustrated in FIG. 4b, unity of the completed building will be assured. In the event that either panel B has a moment applied to it, opposing arrows 28, that panel B will pivot about its panel bottom 30 applying a transverse force to slab A in the direction of the opposite panel B. The opposite panel B attached at its bottom portion 30 will tend to rotate beyond its erected angular disposition and will oppose this transverse force through the cooperation of the tension of the attached hinge member C and the compression of the panel edges E. The structure of FIG. 4b is thus capable of resisting moments applied in any direction to either panel B thereby assuring the structural unity of the erected panels.

It may be desired to form a plurality of adjacent panels into a unitary structure forming a portion of a building, such as a roof. With reference to FIGS. 5a and 5b, this may be accomplished by interconnecting a plurality of adjacent and adjoining slabs 31a through 31f. As illustrated in FIG. 5, slabs 31a through 31f are shown in a horizontal and co-planar disposition attached by integral hinge members C. Adjacent slab edges E are alternately and sequentially faced downward and upward from the juncture between slabs 31a and 31b through the juncture of slabs 31e and 31f. Lifting lugs F are located on each slab overlying the downward facing adjoining edges and are shown adjacent the integral hinge member C between slabs 32a and 32b, 32c and 32d, and 32e and 32f.

Raising of the panel lugs F overlying the downward and adjoining panel edges will form the interconnected panels 31a through 31f into an accordion-like roof structure specifically illustrated in FIG. 5b. Similar to the structure of FIG. 4b, the alternating tension and compression between the integrally attached hinge members C and the opposing panel edges E will maintain the structural integrity of the roof structure so long as the lower panel edges 36 of each panel are maintained in constant spatial relation as erected.

Referring again to FIGS. 3a and 3b, the components of the integral hinge according to the present invention may now be described. Panel edges E when formed of concrete and compressively loaded may tend to chafe, chip or otherwise break away as the hinge is loaded by angular rotation of the adjoined panels. To reinforce the compressive joinder of panels A and B at this juncture, there are attached to the panel edges E edge plates 38. Plates 38 are commonly fabricated of steel and are co-extensive with edges E so as to protect and shield the abutting portions of concrete. Upon rotation of the slabs or panels with respect to one another, plates 38 protect and reinforce the concrete from the compressive engagement along opposing panel edges E.

Edge plates 38 have an additional advantage not immediately apparent. As has previously been described, the formed integral joint will resist forces tending to rotate one panel with respect to the other panel in the direction of arrows 28 further compressing the adjoined panels at their opposing edges E and tensioning integrally attached hinge members C. If, however, the panels are rotated in the opposite direction, the joint between any two panels as illustrated in FIG. 3b will not tend to resist such a force.

Reinforcement of the panel joints specifically illustrated in FIG. 3b may readily be achieved by bonding, typically by welding, the adjoined channel edges so as to permanently attach edge plates 38. It will be noted that edge plates 38 have an exposed metallic surface on the inside corner of the adjoined slabs. A weld bead 44 is formed in this juncture fastening the adjoined slabs through edge plates 38 permanently together. The joint thus formed in cooperation with the integral hinge member C is capable of resisting moments applied to either panel in any direction.

With further reference to FIG. 3, it may be desired to seal the joints as formed. Accordingly, attached to the inward side of edge abutting plates 38 between the concrete of the slab and the plate, there is bendable seal sheet 46. Sheet 46, typically made of bendable material such as plastic, metal and the like, extends the length between the adjoined panels. When plates 38 are rotated with their respective slabs, sheet 46 will bend, forming a continuous weather seal the length of the folded integral hinge formed between the adjoined slabs.

Re-bar 20 in extending between slab ends 19 will undergo considerable stress and deformation when slabs A and B are bent to the fabricated position. Part of the stress will be transmitted interior of each slab through re-bar 20. The concrete immediately adjacent that portion of slab end 19 where integral hinge member C leaves the slab will receive the brunt of such stress. This portion of the rod may tend to move to the outside of the integral hinge member C splaying the adjoining concrete and destroying a portion of the slab. To prevent this result, hinge reinforcing bars 40 and 42 are embedded in each slab parallel to the axis of integrally attached hinge member C. Rods 42 on the outside of re-bar 20 and rods 40 on the inside thereof prevent the re-bar from moving to the outside of the slab, thereby preventing the re-bar from splaying that concrete adjacent slab ends 19.

As is apparent, integral hinge member C and panel edges E of this invention can be fabricated with many different cross-section configurations extending the length of the juncture between ceiling panels A and wall panels B. Some of the more obvious embodiments of the construction joints according to this invention are shown in FIGS. 6 through 15. Molds for fabricating these slabs are now shown as their configuration naturally follows from the illustrated sections.

Referring now to FIGS. 6a and 6b, common folded edge plates 48 are shown forming integral hinge member C attached between the length of conjoined slabs A and B. Slabs A and B each have panel edges E inclined to the ends and sides of the panel at a 45° angle, these edges together opening downwardly from the middle or medial portion of the slabs. Co-extensive with and adjoined to each panel edge E there are attached common edge plates 48 originally disposed in FIG. 7a in the form of an angle having an apex medially between the slabs with two sides extending angularly downward therefrom. Welded or otherwise bonded to the slab side of plates 48 interior for each panel there is slab re-bar 49. Re-bar 49 extends normally upward from each plate to the medial portion of the slab and then curves parallel thereto in a reinforcing disposition to the slab as formed. Attached to slab B at the lower portion of edge E on one edge plate 48 is a spacer lug 50.

As illustrated in FIG. 6b, slabs A and B rotate with respect to one another by bending common folded edge plates 48 from the original angular disposition of 90° separation between each plate to a new position wherein each of the angles as attached to each edge E is parallel to and overlying the adjoining plate and edge. The integral hinge member C is thus formed by the apex of common edge plate 48 which is in turn integrally fastened to slabs A and B.

It will be noted that the apex of common edge plates 48 as bent leaves a spatial separation between the panel edges E, which separation is maintained at the opposite or inner portion of the slab juncture by spacer lug 50. Spacer lug 50 may be bonded, as by welding, to that angle of plate 48 attached to slab B so as to effect a permanent fastening between adjoined panel edges E.

With reference to FIGS. 7a and 7b, opposing panels A and B are shown having ends 19 reinforced by channels 52a and 52b. These channels comprise typically a metal bar of flattened U-shaped section having the side portions thereof extending along the top and bottom of slabs A and B a distance from the slab ends and are integrally attached to the slabs by means of reinforcement loops 54. Loops 54 are bonded to the inward portion of each channel at both ends extending upwardly therefrom parallel to the side portions of each channel curving so as to form a loop. These loops, upon pouring and curing of concrete interior of the mold, permanently attach the channel to the slab. At the bottom portions of slabs A and B bonded to each channel side 55, there is a flat hinge plate 56. Plate 56 as originally attached is co-extensive with each channel side 55 and extends between slab ends 19, which ends are separated by a comparatively narrow spatial interval.

As shown in FIG. 7b, hinge plate 46 as attached to channel sides 55, folds at the medial or middle portion thereof forming the sole support between the adjoined slabs as erected. Unlike the integrally formed hinge member C previously illustrated, plate 56 transmits no opposing tensile and compressive forces and therefore does not assist the erected panels in resisting moments applied to each panel. Accordingly, when a joint is fabricated according to FIG. 7, support of the adjoined slabs is required to prevent angular movement of the slab with respect to one another.

The joint according to FIGS. 7a and 7b has an advantage not immediately apparent. It may be desired to stack or dispose side or wall panels B one on top of another. Accordingly, channel 52b leaves an exposed load surface 58 to which other panel ends may be stacked. This load surface, in cooperation with slab or panel B, permits other members to be placed thereon transmitting the forces of such members independently of the juncture between panels or slabs A and B.

FIGS. 8a and 8b illustrate the interconnection of slabs with sheet hinge members 62 attached between the top sides of channels 60a and 60b, which channels are in turn integrally fastened to ends 19 of slabs A and B. Slab A is shown having reinforcing bar 63 extending medially therein bonded to the central inner portion of channel 60a. Opposing channel 60b is shown attached to slab 64 by means of a reinforcement loop 54 similar to that illustrated in FIGS. 6. Channels 60a and 60b are interconnected at their respective top side portions 65 by means of a sheet hinge member 62, which members wraps over the top sides of the channels and is bonded thereto. Along edge E of panel or slab B there is a weather and cushion seal 66, typically constructed of neoprene and the like, which permits permanent sealing of the joint as formed between the two slabs and cushions the interface between the slabs or panels A and B.

Upon rotation of slab B into the erected position specifically illustrated in FIG. 8b, channel 60b rotates under slab A with weather and cushion seals 66 between the slab and channel. This joint has the advantage of permitting slab B to fully underlie and support slab A.

Attached to slab A there is a side wall edge plate 68. Edge plate 68 is spaced from the channel 60a so as to overlie channel corner 69 of channel 60b. Plate 68 prevents channel corners 69 from penetrating and chipping the concrete of slab 63 and furthermore establishes a bondable surface for the channel corner, permitting a permanent bond for the fabricated joint.

Referring to FIGS. 9a and 9b, the utilization of an arcuate or rounded surface attached to one of the slabs is specifically illustrated. Slab A has an arcuate edge 82 parallel to the slab at upper edge 79 and normal to slab A at lower edge 83. Edge 82 gradually curves through an arc of approximately 90° between upper edge 79 and lower edge 83.

Slab B is shown having an angle 71 permanently attached by anchoring rods 73. Anchoring rods 73 are welded to the inside corner of angle 71 and extends upwardly over common re-bar 77 interior of slab B. Common re-bar 77 is shown disposed between adjoined slabs A and B extending from upper edge 79 of slab A to upper edge 78 of slab B. Interior of both slabs, re-bar 77 extends angularly downward towards the medial portion of each slab.

Immediately underlying upper edge 79 of slab A at the approximate radius of arcuate edge 82 and second angle 85 is embedded in the panel by means of a reinforcing rod 74 similar to the attachment of angle 71 to slab B.

Upon erection of the adjoined slabs, as illustrated in FIG. 9b, common re-bar 77 will dispose arcuately over edge 82. As is apparent, the tensile force of common re-bar 77 will firmly wrap the re-bar about surface or edge 82.

The fabricated joint according to FIG. 9b has an advantage not immediately apparent. In the absence of arcuate surface 82, common re-bar 77 would bend sharply or radically at the upper edges 78 and 79. This radical bend could either weaken the re-bar as attached or alternately chip or otherwise splay the concrete immediately adjoining those places where re-bar 77 leaves slabs A and B. Arcuate edge 82 disposes the re-bar normally at its point of departure from each slab preventing such a sharp bend which could otherwise weaken the re-bar or fragmentize the concrete.

Similar to the joint of FIGS. 8a and 8b, a weather and cushion seal 66 is disposed along the leading edge of slab B so as to compress against the side portion of second slab A in a weather-sealing disposition. Permanent attachment of the joint may be accomplished by welding second angle 85 to first angle 71.

With specific reference to FIGS. 10a and 10b, an alternate embodiment of the joint constructed according to FIG. 9 is illustrated The configuration of adjoined slabs A and B is substantially identical to FIG. 9 with the exception of a weather seal sheet 86 attached to ends 19 of the adjoined slabs. Seal sheet 86 typically comprises a metallic member which is co-extensive with the flat abutting end of slab B and extends to and adjoins slab A at the bottom portion thereof, arcuately curving over edge 82. As disposed between slabs A and B at lower edges 83 thereof, weather seal sheet 86 has an excess width which extends upwardly interior of the spatial interval between the adjoined slabs.

When slab B is rotated with respect to slab A, common re-bar 77 extends over arcuate edge 82 with weather seal sheet 86 therebetween. Seal sheet 86 not only prevents the elements from penetrating between the slabs as adjoined but also serves to cushion and protect the arcuate edge 82 from being fragmentized or penetrated by common re-bar 77 when the re-bar is tensioned. It will be noted that the excess portion of seal sheet 86 originally disposed in the spatial interval between panels A and B wraps along the lower side portion of panel A immediately under arcuate surface 82. In so wrapping, the seal sheet forms a continuous weather barrier against the elements and, furthermore, serves as a second integrally joined hinge C interconnecting the two panels.

With reference to FIGS. 11a and 11b, an integrally formed hinge member utilizing a bendable sheet is illustrated, having the specific advantage of being bendable to form an interlocking structural joint in either of two directions. Abutting slabs A and B are specifically illustrated in FIG. 11a, each slab having two angles 88 at the corner portions thereof. Angles 88 are attached by means of reinforcing bars 89, which bars are welded to the inside apex angle bar at one end and hooked at the opposing end so as to embed the angle structurally within the slabs as formed. Both slabs A and B each have a re-bar 90 embedded therein with a hook end 92 terminating the re-bar adjacent the panel ends. Hook ends 92 passes through a hinge sheet 94 at sheet apertures 95 so as to rigidly fasten sheet 94 between the adjacent slabs.

As illustrated in FIG. 11b, adjoined slabs A and B may be rotated with respect to one another in either angular direction. Upon such rotation, sheet 94 wraps over an angle 88 of slab A at the edge thereof adjoining the rotated slab B, forming the integral hinge member C. It will be noted that sheet 86 in forming the interlocking joint of FIG. 11b, folds at a right angle relative to the end of slab A. Directly abutting this fold is angle edge 97, which edge arrests the tendency of the cement to fragmentize or splay at this juncture.

With reference to FIGS. 12a and 12b, a joint not unlike that of FIG. 11 is illustrated, utilizing channel members 100a and 100b as the end of the opposing slabs and having a hinge bar 102 extending through the channels between adjoined slabs A and B. As illustrated in FIG. 12a, channel members 100a and 100b are each fastened and embedded interior of the slabs by means of reinforcing bars 103. Re-bar 106 is embedded medially in each slab and has a hook portion 107 terminating the re-bar adjacent each panel edge. A hinge bar aperture 109 at each end of hinge bar 102 allows hooked portion 107 of re-bar 106 to pass therethrough, integrally fastening the interconnecting hinge bar to each slab. Hinge bar 102 is welded to the hooked portion of re-bars 106 and additionally to the channel members proximate bar apertures 105 therein.

Attached to the outside portion of channel 100a there is an attachment lug 110. Lug 110 has a bar matting surface 111, which surface is arcuate extending from bar aperture 105 in channel 100a curving outwardly and downwardly toward lug matting surface 112 on the bottom portion of lug 110. Attached to channel member 100b proximate hinge bar 102 there is a second lug 113. Lug 113 has a lug matting surface 112 parallel to the abutting edge of channel member 100b.

Upon rotation of slabs B, hinge bar 102 will then bend. Due to the thickness of the bar adjoining channel 100a hinge bar 102 will extend away from the edge of channel member 100a as it is fastened to slab A. Attachment lug 110 and its bar matting surface will permit such an extension and will furthermore provide a surface about which hinge bar 102 may conveniently wrap without bending in a sharp angular disposition which might otherwise fold or weaken hinge bar 102.

Attachment lugs 110 and 113 have an additional advantage not immediately apparent. Lug matting surfaces 112 on each of the lugs 110 and 113 will slideably engage as slab B is rotated with respect to slab A. This slideable engagement will take place between the opposing lug matting surfaces 112 as specifically illustrated in FIG. 12b. These opposing lug matting surfaces will prevent and arrest vertical movement of the slabs with respect to one another and will serve to center the integral hinge member C precisely. Further, attachment lug 110 on channel 100b will limit the rotation of slab B by contacting edge portion 114 of channel member 100a thereby effecting a completely interlocking hinge joint.

With specific reference to FIGS. 13a and 13b, utilization of eye bolts 116 and 119 to effect the integral hinge structure C is illustrated. Similar to the joint described in FIG. 12, opposing channel members 100a and 100b form the edges of each slab with reinforcing bars effecting permanent attachment to the poured and cured slab. Re-bar 106 is medially located in the slab having a hook portion 107 adjacent the end portion thereof. Medially located in each channel member there are eye bolts 116 and 117. Eye bolt 116 is welded to the hook portion 107 of re-bar 106 and has a nut 118 threadably engaged thereto drawing the expanded eye of bolt 116 against the channel member 100a at an eye bolt aperture therein so as to fasten the eye bolt securely in place. Through that aperture defined by the eye of eye bolt 116 there is passed the eye of second eye bolt 119. This eye bolt, similar to eye bolt 116, extends through the medial portion of channel member 100b and is welded to the hooked portion 107 of re-bar 196. Secure fastening relationship to the channel member 100b is achieved by bolts 120 threadably engaged on both sides of the channel. These bolts permit the eye of second eye bolt 119 to be securely affixed a distance above channel 100b so as to permit the hingeable dispositions specifically illustrated in FIG. 14b.

As erected, slabs A and B are rotated with eye bolts 116 and 119 forming a pivotal swinging connection between the slabs. Similar to the joint illustrated in FIG. 11, the slabs of FIG. 13 may be rotated in either angular direction with respect to one another.

With reference to FIGS. 14a and 14b, an alternate embodiment of the joints of FIGS. 13a and 13b are shown, utilizing three chain links, 125, 126 and 127 respectively. These chain links are fastened interior of the slab by means of re-bar 106 having a hook portion 107 passing through the two end chain links 125 and 127. Chain links 125 and 127 pass through the channels 100a and 100b, integrally fastened to slab A and B respectively, at the medial portions thereof through link apertures 129 and pivotally fastened to medial link 106 therebetween.

As illustrated in FIG. 14b, fabricated slab B is rotated in either direction with respect to slab A and abutting portions of the channels welded to effect closure of the joint as hereinbefore described.

With reference to FIGS. 15a and 15b it may be desired to fabricate panels A and B with an integral beam therein. Accordingly, the panels A and B are shown in FIG. 15a having beams 132 and 133 therein. Beam 132 in panel A is normal to the integral hinge members C and co-extensive with completely underlying that panel to its end while beam 133 attached to panel B is recessed from the end of panel B so as to underlie in supporting relationship beam 132 when the panels are rotated with respect to one another. A beam recess 134 is configured in panel B so that in the rotated or erected disposition beam 132 of panel A mates therewith permitting an integral supporting structure between adjoined panel B and beam 132 in panel A.

It will be remembered that in FIG. 2, a building structure was specifically illustrated. It may be desired to fabricate multiple story dwellings by stacking units constructed according to the present invention one on top of another. Furthermore, such structures may be placed in a side by side relation to form a multiple unit dwelling such as an apartment house, motel or other similar structure. In formation of such a structure, it will be desirable to fasten the building units in their stacked or side by side relation so as to tie and permanently fasten the units into a single and integrated building structure.

Figure 16:
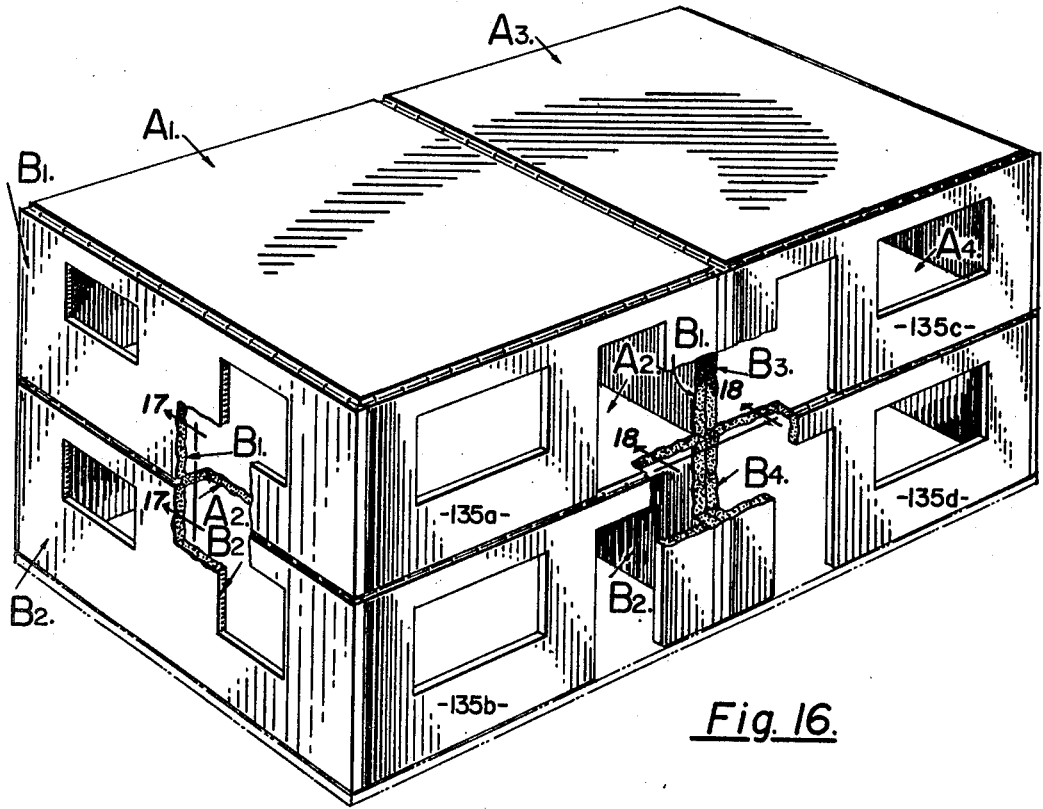
FIG. 16 is a side elevation view of four building units, which units are stacked side by side two high and two wide to form an apartment house type complex.

Referring now to FIG. 16, a tower construction of units similar to those illustrated in FIG. 2 as specifically illustrated. Four stacked and adjoined buildings are shown with two units 135a and 135c placed side by side and stacked on top of two other side by side units 135b and 135d.

Figure 17:
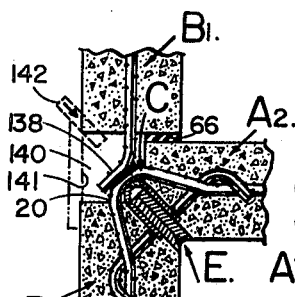
FIG. 17 is a side elevation section of an outside wall construction of the units of FIG. 16 at lines 17—17 showing two hingedly joined panels with a third panel supported thereon and attached thereto.

FIG. 17 illustrates the outside corner construction at lines 17—17 of the buildings of FIG. 16 wherein the outside concrete wall B1 of first building 135a is shown stacked immediately over slabs A2 and B2 of second building 135b. Slabs A2 and B2 have a joint similar to that of FIG. 3a. Integral hinge member C between slabs A2 and B2 is exposed and accordingly re-bar member protruding from adjoining and stacked slabs may readily be fastened thereto.

As illustrated in FIG. 17, re-bar 138 protrudes from the lower portion of panel B1 and is fastened or bonded to exposed integral hinge member C typically by welding. Weather and cushion seal 66 is placed between panel B1 and ceiling slab A2 for effecting a seal and permanent joint between panels. After the panels are placed in the erected position, a cavity 140 defined by the three panel sides has its open side 141 closed, typically by a small form, and concrete is poured therein through concrete aperture 142 to effect a permanent joint embedding the integral hinge member C and attached re-bar 138 of slab B1 in the cured concrete.

Figure 18:
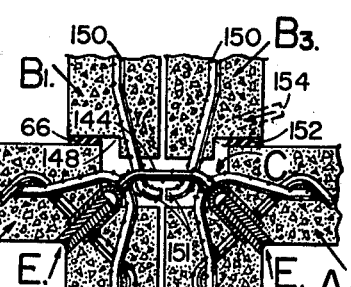
FIG. 18 is a side elevation section of the junction of six panels interior of a towered or stacked building structure according to FIG. 16 at lines 18—18 specifically illustrating the use of parallel and adjoining wall slabs to form a unitary wall structure having a double thickness.

Referring again to FIG. 16 at a section taken along lines 18—18, it will be noted that this juncture is the intersection of six slabs, joinder of which slabs is specifically illustrated in FIG. 18. Panels B2 and B4 having integral hinge member C according to the embodiment of FIG. 3 are placed back-to-back with panels A2 and A4 extending horizontally in opposite directions. Hinge tie members 144 fasten integral hinge member C together by wrapping under the loop of common re-bar 20 and being welded thereto. This member 144 thus holds slabs B2 and B4 in parallel and adjoining relationship. Panels B1 and B3 are stacked on top of ceiling slabs A2 and A4 respectively. The side wall panels, B1 and B3, each have a recessed step 148 which is cut or formed from the inner surface of the panel and extends to the medial portion thereof. The panels at these recess steps are placed on top of ceiling panels A2 and A4 with the panel ends extending interior of the recess 152 defined by the juncture of the six panels. Similar to joints previously illustrated, a weather and cushion seal 66 is inserted between the stacked panels.

Extending from the ends of each of the panels or slabs B1 and B3 is a re-bar 150 which extends downwardly from its embedded disposition interior of each panel and has a hooked portion 151 immediately below the panel end. This hooked portion extends interior of aperture 152, which cavity is subsequently filled with concrete through concrete aperture 154 so as to embed the integral hinge member C, the hinge tie member 144 and hook portion 151 of protruding re-bar 150.

It will be noted that section 18—18 of FIG. 16 comprise the joinder of six panels of buildings 135a, b, c and d. In order to save construction material, it may be desired to eliminate side wall panels B1 and B3 illustrated in FIG. 18 and substitute the joints specifically illustrated in FIG. 19 therefor.

Figure 19:
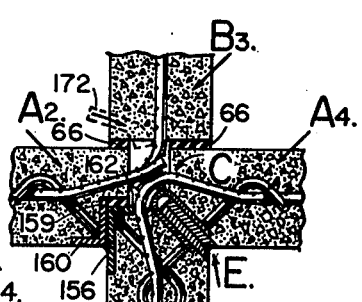
FIG. 19 is a side elevation section of a four slab building joint illustrating an alternate construction of the building of FIG. 16.

Bonding of four panels A2, B3, B4 and A4 is specifically illustrated in FIG. 19. Slabs B4 and A4 are shown joined by an integral hinge member C similar to that previously described in regard to FIG. 3b. Slab B4 has affixed to the outside corner thereof angle bar 156, which bar has a reinforcing rod welded to the inside apex thereof. This reinforcing bar extends interior of slab B4 fastening about the embedded portion of the integral hinge member C. Slab A2 has a recess step 159 faced by an angle bar 160, which angle bar is positioned so as to rest on the edge 162 of slab B4. Similar to angle bar 156, angle 160 has a reinforcing rod member welded to the inside apex thereof which is embedded in panel A2 by hooking about the re-bar interior of the slab. Re-bar 164 of panel A2 protrudes from the end portion of the panel and is welded to integral hinge member C at the exposed portion. As shown in FIG. 19 after placement of slabs A2, A4 and B4, angle bars 156 and 160 are welded at the adjoining portions thereof to effect permanent attachment of the slabs. Slab B3 is stacked on top of the joined slabs A2 and A4 and has a re-bar 170 protruding from the end portion thereof. Bar 170 extends interior of an enclosure 171 which is defined by the four adjoining slabs. After stacking, enclosure 171 is filled with concrete through aperture 172 enabling all of the protruding hinge members and re-bar elements to be permanently embedded therein.

All of the integral folding joints illustrated thus far have shown the joined panels having right angles. As is apparent, the integral hinge member C and panel edges E may be configured so as to form an erected disposition between the adjoining panels which is at an acute or obsuse angle.

Figures 20A, 20B:
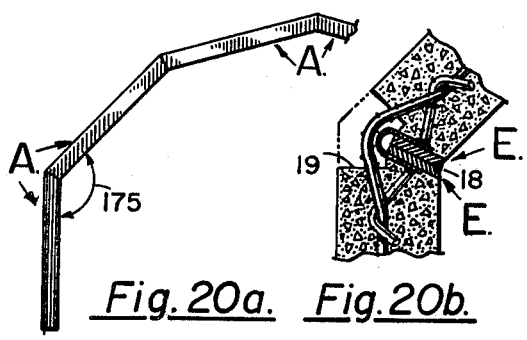

With specific reference to FIGS. 19a and 19b, a portion of the arch structure constructed according to the present method and apparatus is specifically illustrated. As seen from FIG. 19, adjoined slabs A form an obtuse angle 175 therebetween. In the detail of FIG. 19b, this is accomplished by tapering the panel edge E at an angle which is less than 45° with respect to panel end 19 thereby effecting opposing contact between the panel surfaces at an interface 18 which disposes the panels at the desired angular configuration. With such changes in the angular disposition of the panel edges E with respect to the panels, a culvert as illustrated in FIG. 20 or alternately, a canal as illustrated in FIG. 21 may be constructed using the apparatus method of the disclosed invention.

FIGS. 22a and 22b illustrate the construction of a pyramid roof type structure having a square base utilizing the disclosed method and apparatus of the present invention. As is apparent from FIGS. 22a, four isosceles triangular slabs 180 are disposed with apex 182 between the equal sides converging at a common point. Triangular slabs 180 are adjoined by means of integral hinge members C extending between the triangular slabs at their adjoining sides 184. The non-adjoining sides 185 are shown having re-bar tip 186 protruding therefrom. As is apparent, the configuration of the integral hinge member C may be any one of the numerous hinge member embodiments heretofore illustrated.

As fabricated, the four isosceles triangular slabs 180 are specifically illustrated in FIG. 22b. The slabs are angularly disposed to one another to complete the foldable joint and the nonadjoining sides 185 bonded together as by welding to firmly fasten the pyramid structure.

All hinge configurations illustrated thus far have shown slabs hinged at the corner or edge portions thereof. The principles of this invention may as well be applied to the attachment of one slab with the edge of that slab adjoined to the medial portion of another slab. Such a medially-hinged slab will have the advantage of permitting an interior load supporting wall to be erected simultaneously with the outer wall members so as to effect the erection of a building with internal walls according to the present technique.

With reference to FIGS. 24a and 24b, the construction of the building has medially-hinged walls specifically illustrated. FIGS. 24a show a center wall slab B5 parallel to and immediately below a ceiling slab A. An integral hinge member C, attached to the medial portion of slab A, hingedly attaches slab B5 so as to permit rotation of the inner wall as specifically illustrated in FIG. 24b.

In the fabrication of the slabs illustrated in FIG. 24a, slab B5 with its integrally attached hinge member C is first fabricated and thereafter slab A and its attached side wall slabs B are fabricated in a position parallel to and overlying slab B5. To provide the desired spatial separation between slab B5 and ceiling slab A there is placed a layer of sand 190, which sand upon erection of the walls falls away from between the walls and may thereafter be easily removed.

As illustrated in FIG. 24b, ceiling slab A is elevated by means of lugs F attached to a lifting apparatus (not shown). As specifically illustrated in FIG. 4, side walls B gravitationally rotate in a depending relation to the erected position. Similarly, center wall B5 rotates about its hinged attachment to slab A forming the central supporting panel, the erected position of which is illustrated in FIG. 24b.

With reference to FIGS. 24c and 24d a section of the hinge of panel B5 to ceiling panel A is specifically illustrated. Panel B5 has a channel member 100 placed at the end portion thereof. Common re-bar 20 is inserted through a channel side aperture 192 in channel 100 and curves arcuately interior of slab B5 along the medial portion thereof for reinforcing the panel. Typically, panel B5 will have concrete poured interior of its conforming mold and this concrete cured for effecting permanent attachment of the re-bar 20 interior of panel B5. After such pouring and curing, a layer of sand 190 is placed on top of the formed panel. Thereafter, the mold ceiling panel A is disposed.

Panel A has an abutment plate 194 formed integrally with the panel immediately overlying the end portion of slab B5 and extending therefrom in anticipation of the erected position of the medially-hinged slab. Plate 194 is here shown affixed integrally to slab A by attachment rod 195, which rod is bonded to the slab side of plate 194 and extends angularly upward, looping over reinforcement bar 197 interior of slab A. Common re-bar 20 from slab B5 extends through an abutment plate aperture 199 in plate 194 and curves arcuately interior of slab A to the medial portion thereof, so as to be integrally attached when the ceiling slab is poured and cured.

With reference to FIG. 24d, the erected disposition of slab B5 is specifically illustrated. Common re-bar 20 forms the integrally attached hinge member C, permitting slab B5 to rotate to a position normal to ceiling slab A. In such a position, edge E defined by the outward facing portion of channel 100 attached to slab B5 abuts and contacts abutment plate 194. As previously explained, the contact of the outside portion of channel member 100 with the abutment plate will be a zone of compression whereas integral hinge member C, herein the form of common re-bar 20 embedded and extended between the adjoined slabs, will provide a tensional force limiting rotation of the slab. Permanent affixture of the medially-hinged slab may be accomplished by welding the exposed side portion 200 of channel 100b to abutment plate 194.

With specific reference to FIGS. 24e and 24f, an alternate embodiment of medially-hinged slab joint is illustrated. Slab B5 has a channel 202 affixed thereto. This channel fits over end 19 of slab B5, which end is narrower in cross section, defining a re-bar engaging step 204 at the top portion of the slab B5. Common re-bar member 20 extends medially along slab B5 and bends angularly at the end portion of the slab upwardly departing the slab. At the lower portion of the re-bar engaging step a channel attachment member 206, welded to an inside corner of the channel extends upwardly therefrom and wraps over re-bar 20 at the point where the re-bar angularly bends upwardly towards the end of slab B5. This channel attachment member serves both to integrally fasten channel 202 to the end of slab B5 and furthemore, serves to prevent common re-bar 20 from moving interior of slab B5 when the integral hinge member C, formed from the common re-bar, is placed under tension.

Common re-bar 20 upon leaving slab B5 extends at a constant angular disposition of approximately 45° embedding itself interior of slab A. Re-bar 20 wraps over reinforcing rod 197 of slab A and then extends normally downward terminating in its attachment to abutment plate 208. Plate 208 is welded to re-bar 20 at one side thereof and is placed on the lower edge of ceiling slab A in an anticipation of the erected disposition of slab B5.

Upon erection, slab B5 rotates from its parallel disposition to slab A through an arc of approximately 90° wherein the medially-hinged wall slab is normal to ceiling slab A. End corner portion 210 of channel 202 abuts directly against abutment plate 208 and may be used to fasten the slabs in the rotated positions, as by welding corner portion 210 to abutment plate 208. Integral hinge member C formed from common re-bar 20 folds along re-bar engaging step 204, which step permits the integral hinge member to be recessed relative to slab surface 212 of wall panel B5.

It will be noted that medially-hinged wall panels or slabs B5 specifically illustrated in FIGS. 24d and 24f underlie their respective ceiling panels A in a supporting disposition. As illustrated in FIG. 24f, a series of such walls may be placed one on top of the other to, in effect, transmit the static forces of an erected building directly through the concrete structure without loading joint members.

What is claimed is:

1. A method of erecting a building structure upon a primary support including the steps of: forming a first slab having a plurality of outer edges; forming a plurality of second slabs each having a first edge and a second edge; placing said second slabs with the first edge of said second slabs in juxtaposition to an edge of said first slab; coupling said slabs by a hinge-like joinder adjacent said juxtaposed edges; raising said first slab to a horizontal, elevated position while depending said second slabs about said hinge-like joinder into vertical positions with the second edges of said vertical slabs resting on said primary support.

2. A method of erecting a building structure upon a primary support including the steps of: forming a pair of panels, positioning said panels in a substantially coplanar relationship with one edge of each panel being in parallel juxtaposition with an edge of the other panel, embedding integral hinged members connecting each of said panels along said juxtapositioned edges, raising one of said panels to a horizontal, elevated position, and depending the other of said panels in a substantially vertical position, underlying the vertical panel under a portion of the horizontal panel to provide a support for the horizontal panel and maintaining the hinged member under tension to hold said vertical panel in supporting relationship with respect to said horizontal panel.

References Cited

UNITED STATES PATENTS

| | | | |
|---|---|---|---|
| 2,372,200 | 3/1945 | Hayes | 52—583 X |
| 2,462,415 | 2/1949 | Nagel | 52—583 |
| 2,497,887 | 2/1950 | Hilpert | 52—122 X |
| 2,670,986 | 3/1954 | Presnell | 52—71 X |
| 3,177,530 | 4/1965 | DePew | 52—71 |
| 3,331,181 | 7/1967 | Schmidt | 52—18 X |

FOREIGN PATENTS

| | | |
|---|---|---|
| 118,228 | 7/1959 | Russia. |
| 260,262 | 2/1947 | Switzerland. |
| 997,182 | 1/1952 | France. |

FRANK L. ABBOTT, Primary Examiner

S. D. BURKE III, Assistant Examiner

U.S. Cl. X.R.

52—69, 122, 583, 236